United States Patent
Fujita et al.

(10) Patent No.: US 8,911,051 B2
(45) Date of Patent: Dec. 16, 2014

(54) DOT DATA GENERATING METHOD, DOT DATA GENERATING DEVICE, INKJET RECORDING DEVICE, AND INKJET RECORDING SYSTEM

(71) Applicant: Seiko Epson Coporation, Tokyo (JP)

(72) Inventors: Toru Fujita, Nagano (JP); Yoichi Mitsui, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/015,379

(22) Filed: Aug. 30, 2013

(65) Prior Publication Data
US 2014/0063107 A1 Mar. 6, 2014

(30) Foreign Application Priority Data

Aug. 31, 2012 (JP) ................. 2012-191464

(51) Int. Cl.
| | | |
|---|---|---|
| *B41J 2/205* | (2006.01) | |
| *G06K 15/02* | (2006.01) | |
| *H04N 1/405* | (2006.01) | |
| *H04N 1/60* | (2006.01) | |
| *G06K 15/10* | (2006.01) | |
| *B41J 2/21* | (2006.01) | |
| *B41J 3/407* | (2006.01) | |

(52) U.S. Cl.
CPC ............ *B41J 2/2054* (2013.01); *G06K 15/026* (2013.01); *H04N 1/4057* (2013.01); *H04N 1/6052* (2013.01); *G06K 15/102* (2013.01); *B41J 2/2128* (2013.01); *B41J 3/4078* (2013.01)
USPC .............................. 347/15; 347/41

(58) Field of Classification Search
CPC ............ B41J 29/38; B41J 19/05; B41J 2/205; B41J 11/51; B41J 11/425; B41J 15/18; B41J 15/20; B41J 15/22; B41J 15/24
USPC .................. 347/10–11, 14–16, 19, 43, 57, 60
See application file for complete search history.

(56) References Cited

U.S. PATENT DOCUMENTS

| | | | |
|---|---|---|---|
| 8,186,793 B2 * | 5/2012 | Hosaka et al. | ................... 347/14 |
| 8,643,891 B2 * | 2/2014 | Fujita et al. | ..................... 358/1.2 |
| 2009/0167833 A1 | 7/2009 | Mochizuki | |
| 2012/0086956 A1 | 4/2012 | Hirao | |

FOREIGN PATENT DOCUMENTS

JP      2009-173443 A      8/2009

OTHER PUBLICATIONS

The extended European Search Report for European Application No. 13182655.4 mailed Dec. 16, 2013.

* cited by examiner

*Primary Examiner* — Thinh Nguyen
(74) *Attorney, Agent, or Firm* — Global IP Counselors, LLP (57) ABSTRACT

In a case where a first image is printed on a recording medium based on first dot data using the first inkjet recording device and a second image is printed based on second dot data on another recording medium using the second inkjet recording device in which ejected ink drops land onto a recording medium with a small degree of dispersion in a main scanning direction compared to the first inkjet recording device, the first dot data is converted to generate the second dot data such that data of a large dot and a medium dot is converted so as to form a plurality of dots having sizes smaller than the dot size at predetermined intervals between the dots in the main scanning direction in place of the large dot and the medium dot.

8 Claims, 6 Drawing Sheets

DOT DATA GENERATING METHOD, DOT DATA GENERATING DEVICE, INKJET RECORDING DEVICE, AND INKJET RECORDING SYSTEM

CROSS-REFERENCE TO RELATED APPLICATIONS

This application claims priority to Japanese Patent Application No. 2012-191464 filed on Aug. 31, 2012. The entire disclosure of Japanese Patent Application No. 2012-191464 is hereby incorporated herein by reference.

BACKGROUND

1. Technical Field

The present invention relates to a dot data generating method which generates dot data used for an inkjet recording device, a dot data generating device, an inkjet recording device, and an inkjet recording system.

2. Background Technology

An inkjet textile printing device has been known in which printing of an image is conducted to fabric by ejecting ink from a recording head (see Patent Document 1). In a case where printing is conducted using this inkjet textile printing device, printing of a sample image (proofreading) is conducted in advance, and printing of an actual image is conducted after confirming the design, the color, and the like. More specifically, two inkjet textile printing devices are prepared so as to continuously print actual images of a plurality of kinds of designs, and while an actual image of one design is being printed by one of the inkjet textile printing devices, a sample image of the next design is printed by the other of inkjet textile printing devices. Further, since a large-sized inkjet textile printing device (machine for mass production) is not required for printing of a sample image, usually, printing of a sample image is conducted by a small-sized inkjet textile printing device and printing of an actual image is conducted by a large-sized inkjet textile printing device.

Japanese Laid-open Patent Publication No. 2009-173443 (Patent Document 1) is an example of the related art.

SUMMARY

Problem to be Solved by the Invention

The way how ejected ink drops land onto fabric (a recording medium) is different between a large-sized inkjet textile printing device (first inkjet recording device) and a small-sized inkjet textile printing device (second inkjet recording device). For example, in the large-sized inkjet textile printing device, compared to the small-sized inkjet textile printing device, the installation number of recording heads (inkjet heads) is large and the scanning speed of the recording head with respect to fabric is high. Therefore, a strong air flow is generated in the main scanning direction between the surface of the fabric and the nozzle surface of the recording head at the time of a main scan of the recording head. In the large-sized inkjet textile printing device, an ink drop of one shot ejected from the recording head lands onto fabric with being dispersed in the main scanning direction due to this air flow, and thus a plurality of dots are formed with being dispersed in the main scanning direction. On the other hand, in the small-sized inkjet textile printing device, since this air flow is hardly ever generated, one dot is formed without forming a plurality of dots dispersed in the main scanning direction. Consequently, if common dot data is used for both of the inkjet textile printing devices, an actual image (first image) printed by the large-sized inkjet textile printing device is more blurred as a whole compared to a sample image (second image) printed by the small-sized inkjet textile printing device because a plurality of dots are formed with being dispersed in the main scanning direction. For a sample image, it is desired that the print quality is made similar to that of an actual image as much as possible. However, in a case where the small-sized inkjet textile printing device is used for printing a sample image, print quality similar to an actual image printed by the large-sized inkjet textile printing device cannot be obtained.

The advantage of the invention is to provide a dot data generating method, a dot data generating device, an inkjet recording device, and an inkjet recording system in which a second image of print quality similar to that of a first image can be obtained in a case where the second image is printed by a second inkjet recording device in which an ejected ink drop lands onto a recording medium differently from a first inkjet recording device for printing the first image.

Means for Solving Problem

A dot data generating method according to the invention is a dot data generating method using a first inkjet recording device and a second inkjet recording device, each of which conducts printing of an image by ejecting ink drops from an inkjet head and forming dots of various sizes on a recording medium while relatively moving the inkjet head with respect to the recording medium, with the inkjet head being able to form dots of a plurality of types of sizes on a recording medium, in which a first image is printed using the first inkjet recording device by ejecting ink drops from the inkjet head onto the recording medium based on first dot data which determines formation or non-formation of dots and sizes of dots, and second dot data is generated to print a second image by ejecting ink drops from the inkjet head onto another recording medium based on the second dot data using the second inkjet recording device in which ejected ink drops land onto a recording medium with a small degree of dispersion in a relative movement direction compared to the first inkjet recording device, the dot data generating method including a data conversion step which generates the second dot data by converting the first dot data such that data of each dot in which at least a maximum dot size is determined is converted so as to form a plurality of dots having sizes smaller than the maximum dot size at predetermined intervals between the dots in the relative movement direction in place of the each dot.

A dot data generating device according to the invention is a dot data generating device using a first inkjet recording device and a second inkjet recording device, each of which conducts printing of an image by ejecting ink drops from an inkjet head and forming dots of various sizes on a recording medium while relatively moving the inkjet head with respect to the recording medium, with the inkjet head being able to form dots of a plurality of types of sizes on a recording medium, in which a first image is printed using the first inkjet recording device by ejecting ink drops from the inkjet head onto the recording medium based on first dot data which determines formation or non-formation of dots and sizes of dots, and second dot data is generated to print a second image by ejecting ink drops from the inkjet head onto another recording medium based on the second dot data using the second inkjet recording device in which ejected ink drops land onto a recording medium with a small degree of dispersion in a relative movement direction compared to the first inkjet recording device, the dot data generating device including a data conversion section which generates the second dot data by converting the first dot data such that data of each dot in which at least a maximum dot size is determined is converted so as to form a plurality of dots having sizes smaller than the maximum dot size at predetermined intervals between the dots in the relative movement direction in place of the each dot.

An inkjet recording device according to the invention is an inkjet recording device which prints a second image by ejecting ink drops from an inkjet head and forming dots of various sizes on a recording medium while relatively moving the inkjet head with respect to the recording medium, with the inkjet head being able to form dots of a plurality of types of sizes on a recording medium, based on second dot data generated by converting first dot data which is used for another inkjet recording device which prints a first image by ejecting ink drops from an inkjet head onto a recording medium while relatively moving the inkjet head with respect to the recording medium, with the inkjet head being able to form dots of a plurality of types of sizes on a recording medium, based on the first dot data which determines formation or non-formation of dots and sizes of dots, in the inkjet recording device, ejected ink drops landing onto a recording medium with a small degree of dispersion in a relative movement direction compared to the another inkjet recording device, the inkjet recording device including a data conversion section which generates the second dot data by converting the first dot data such that data of each dot in which at least a maximum dot size is determined is converted so as to form a plurality of dots having sizes smaller than the maximum dot size at predetermined intervals between the dots in the relative movement direction in place of the each dot.

An inkjet recording system according to the invention is an inkjet recording system using a first inkjet recording device and a second inkjet recording device, each of which conducts printing of an image by ejecting ink drops from an inkjet head and forming dots of various sizes on a recording medium while relatively moving the inkjet head with respect to the recording medium, with the inkjet head being able to form dots of a plurality of types of sizes on a recording medium, in which a first image is printed using the first inkjet recording device by ejecting ink drops from the inkjet head onto the recording medium based on first dot data which determines formation or non-formation of dots and sizes of dots, and a second image is printed by ejecting ink drops from the inkjet head onto another recording medium based on second dot data using the second inkjet recording device in which ejected ink drops land onto a recording medium with a small degree of dispersion in a relative movement direction compared to the first inkjet recording device, the inkjet recording system including the first inkjet recording device, the second inkjet recording device, and a dot data generating device which generates the second dot data, and the dot data generating device including a data conversion section which generates the second dot data by converting the first dot data such that data of each dot in which at least a maximum dot size is determined is converted so as to form a plurality of dots having sizes smaller than the maximum dot size at predetermined intervals between the dots in the relative movement direction in place of the each dot.

Another inkjet recording system according to the invention is an inkjet recording system using a first inkjet recording device and a second inkjet recording device, each of which conducts printing of an image by ejecting ink drops from an inkjet head and forming dots of various sizes on a recording medium while relatively moving the inkjet head with respect to the recording medium, with the inkjet head being able to form dots of a plurality of types of sizes on a recording medium, in which a first image is printed using the first inkjet recording device by ejecting ink drops from the inkjet head onto the recording medium based on first dot data which determines formation or non-formation of dots and sizes of dots, and a second image is printed by ejecting ink drops from the inkjet head onto another recording medium based on second dot data using the second inkjet recording device in which ejected ink drops land onto a recording medium with a small degree of dispersion in a relative movement direction compared to the first inkjet recording device, the inkjet recording system including the first inkjet recording device and the second inkjet recording device, and the second inkjet recording device including a data conversion section which generates the second dot data by converting the first dot data such that data of each dot in which at least a maximum dot size is determined is converted so as to form a plurality of dots having sizes smaller than the maximum dot size at predetermined intervals between the dots in the relative movement direction in place of the each dot.

With this configuration, in the second inkjet recording device (inkjet recording device) in which ejected ink drops land onto a recording medium with a small degree of dispersion (ink dispersion degree) in the main scanning direction compared to the first inkjet recording device (another inkjet recording device), the second image is printed based on the second dot data generated by converting the first dot data such that data of each dot in which at least a maximum dot size is determined is converted so as to form a plurality of dots having sizes smaller than the maximum dot size at predetermined intervals between the dots in the relative movement direction in place of the each dot. Therefore, dots formed by the second inkjet recording device based on the second dot data are formed with being dispersed in the main scanning direction similarly to dots formed by the first inkjet recording device based on the first dot data, compared to dots formed by the second inkjet recording device based on the first dot data, if dots were formed by the second inkjet recording device based on the first dot data. Consequently, the second image of print quality similar to the first image can be obtained even in a case where the second image is printed by the second inkjet recording device of a small ink dispersion degree compared to the first inkjet recording device. That is, although the image is blurred in the first inkjet recording device because dots are formed with being dispersed in the main scanning direction, dots are formed with being dispersed in the main scanning direction also in the second inkjet recording device by using the second dot data converted as described above. As a result, the second image of similar print quality can be obtained.

Preferably, the above-described dot data generating method further includes a gap acquisition step which acquires a work gap between a surface of the recording medium and a nozzle surface of the inkjet head in the first inkjet recording device, and an interval setting step which sets the predetermined interval based on an acquired work gap.

In the first inkjet recording device, when the work gap is changed corresponding to the kind or the like of the recording medium, the ink dispersion degree will change accordingly. More specifically, when the work gap becomes large, the ink dispersion degree will become large. According to the present configuration, however, by setting the predetermined interval based on the work gap, dots can be formed with a similar degree of dispersion by the second inkjet recording device corresponding to the ink dispersion degree which is changed by the work gap in the first inkjet recording device. Therefore, even when the work gap is changed and the degree of blur of the first image is changed in the first inkjet recording device, the second image with a degree of blur corresponding to the change can be printed by the second inkjet recording device.

Here, preferably, the above-described dot data generating method further includes an interval changing step which changes the predetermined interval based on input of a user.

With this configuration, a user can optionally change the degree of blur of the second image to be printed by the second inkjet recording device. Therefore, even in a case where the print quality (the degree of blur) of the first image printed by the first inkjet recording device is different due to the kind of the recording medium printed by the first inkjet recording device, the print resolution and the design of the first image, and the like, a user can change the degree of blur of the second image to be printed by the second inkjet recording device accordingly.

Here, preferably in the data conversion step, in a case where a plurality of dots are formed with being overlapped by converting the data, the data is further converted such that the plurality of dots are synthesized into a single dot.

In order to form a plurality of dots with being overlapped, the ejection operation becomes complicated because a plurality of shots of ink drops need to be ejected and caused to land onto the same position of the recording medium from the inkjet head. With the present configuration, however, that complicated operation can be avoided.

BRIEF DESCRIPTION OF THE DRAWINGS

Referring now to the attached drawings which form a part of this original disclosure:

FIGS. 5A-5C are diagrams that explain dot data by dots formed by the dot data, in which FIGS. 6A-6C are diagrams that show the dot data shown in FIGS. 5A-5C per pixel, in which

DETAILED DESCRIPTION OF EXEMPLARY EMBODIMENTS

Figure 1:
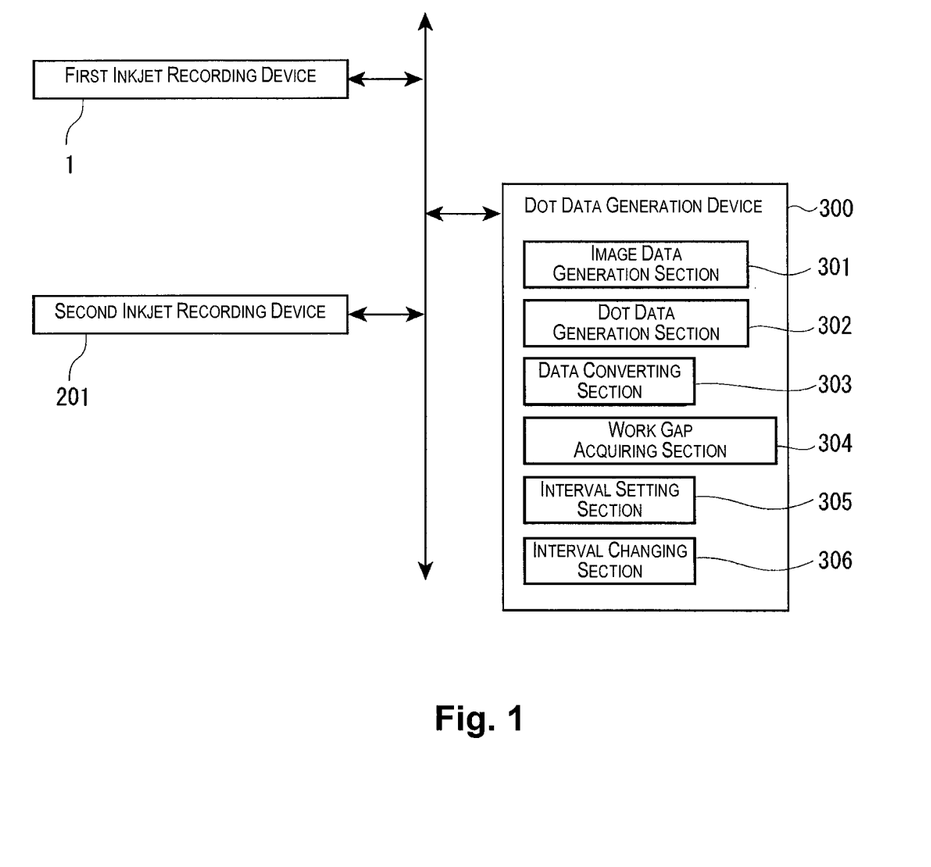
FIG. 1 is a configuration diagram of an inkjet recording system according to an embodiment.

Hereinafter, an inkjet recording system according to an embodiment of the invention will be explained with reference to the attached drawings. As shown in FIG. 1, the inkjet recording system has a large-sized first inkjet recording device 1, a small-sized second inkjet recording device 201 which is installed with the first inkjet recording device 1, and a dot data generating device 300 which generates dot data used for the first inkjet recording device 1 and the second inkjet recording device 201. The first inkjet recording device 1 is a machine for mass production, and conducts printing of an actual image (first image) at high speed. On the other hand, the second inkjet recording device 201 is a machine for producing a sample, and conducts printing of a sample image (second image) to confirm the design, the color, and the like before printing an actual image by the first inkjet recording device 1.

Figure 2:
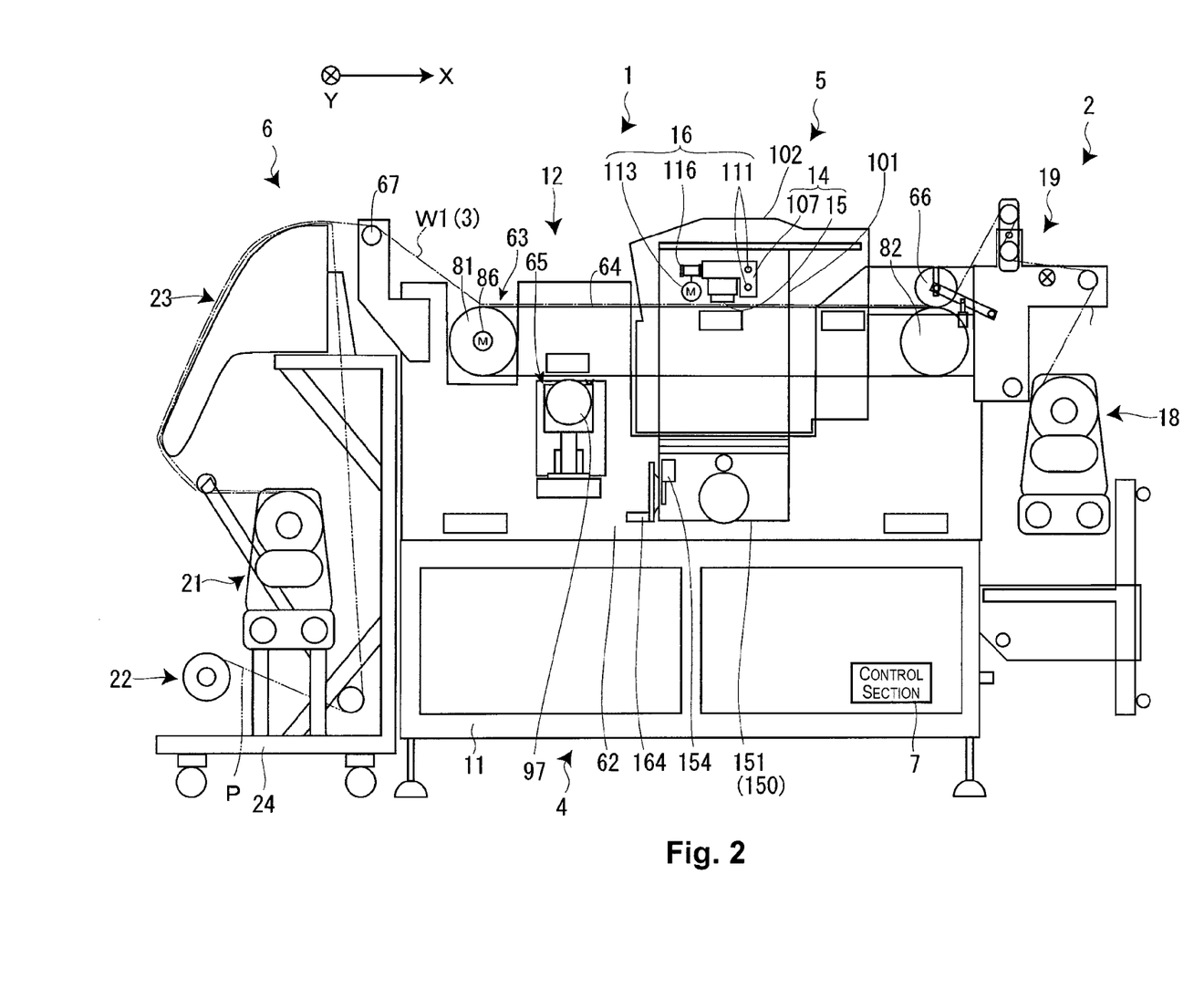
FIG. 2 is a cross-sectional configuration diagram that schematically shows a first inkjet recording device which configures the inkjet recording system.

As shown in FIG. 2, the first inkjet recording device 1 conducts printing (textile printing) of patterns or the like by an inkjet method using dye ink to fabric W1 (original fabric) to be fed and removed by a so-called reel-to-reel method. In the following explanation of the first inkjet recording device 1, a forward and backward feed direction of the fabric W1 is defined as an X axial direction, and a direction orthogonal to the X axial direction is defined as a Y axial direction. Also, the first inkjet recording device 1 can conduct printing to the fabric W1 having a maximum width of 1.5 m. Therefore, the first inkjet recording device 1 has a size in the Y axial direction corresponding thereto (approximately 2.5 m), and the size of the X axial direction is also similar thereto (approximately 2.5 m).

As shown in the same drawing, the first inkjet recording device 1 has a reeling-out section 2, a device main body 4, a printing section 5, a winding section 6, and a control section 7. The reeling-out section 2 reels out and feeds the fabric W1 wound in a roll shape. The device main body 4 feeds the fabric W1, which has been reeled out, along a feed route 3 for printing. The printing section 5 is arranged above the device main body 4, and conducts printing to the fabric W1 by an inkjet method in cooperation with the device main body 4. The winding section 6 winds the fabric W1, to which printing has been conducted by the printing section 5, on the downstream side of the feed direction of the device main body 4 so as to withdraw it. The control section 7 conducts overall control to the entire device of this configuration.

The device main body 4 has a main body base 11 constructed by assembling steel materials, and a medium feed mechanism 12 which is supported by the main body base 11 and intermittently feeds the fabric W1 in the X axial direction by belt delivery. The printing section 5 has a carriage unit 14 which has an inkjet head 15, and a head moving mechanism 16 which moves the carriage unit 14 back and forth in the Y axial direction. On the other hand, the reeling-out section 2 has a reeling-out unit 18 which reels out the fabric W1, and a slack take-up unit 19 for taking up the slack of the fabric W1 which has been reeled out. The winding section 6 has a winding unit 21 which winds the fabric W1, a slip sheet unit 22 which supplies a slip sheet to the winding unit 21, and a heater unit 23 for vaporizing a solvent (moisture) of dye ink which has soaked into the fabric W1 before winding the fabric W1. The winding section 6 is constructed by installing the winding unit 21, the slip sheet unit 22, and the heater unit 23 in a winding section base 24.

The slack of the fabric W1 reeled out from the reeling-out unit 18 is taken up such that tension is given by the slack take-up unit 19, and then the fabric W1 is fed to the medium feed mechanism 12. The fabric W1 fed to the medium feed mechanism 12 is delivered by a belt such that the fabric W1 adheres to the surface of the belt. While intermittently feeding (sub scanning) the fabric W1 in the X axial direction by this belt delivery, the carriage unit 14 moves back and forth in the Y axial direction in synchronization with this, and ink is ejected from the inkjet head 15 (main scanning).

After printing is conducted in this manner, a portion of the fabric W1 in which printing has been completed (a portion in which textile printing has been completed) is fed from the medium feed mechanism 12 to the winding section 6. In the winding section 6, a slip sheet P is continuously supplied from the slip sheet unit 22 to the fabric W1 fed from the medium feed mechanism 12, and the slip sheet P and the fabric W1 overlapped with each other are fed to the heater unit 23. In the heater unit 23, the fabric W1 is heated together with the slip sheet P, and a solvent (moisture) of dye ink is vaporized. Then, the fabric W1 in which textile printing has been completed and a drying process has been conducted is wound by the winding unit 21 together with the slip sheet P.

The medium feed mechanism 12 has a pair of side frames 62 which is mounted and fixed onto the above-described main body base 11 on the right and left (in the Y axial the direction), a belt delivery unit 63 which is supported by the pair of side frames 62 and has a delivery belt 64 with no end, and a belt cleaner unit 65 which is arranged below the belt delivery unit 63 and cleans the delivery belt 64 with a rotation brush 97. The medium feed mechanism 12 also has a pressing roller 66 and a separating roller 67. The pressing roller 66 faces the belt delivery unit 63 from above on the upstream side, and attaches the fabric W1, which has been fed from the slack take-up unit 19, to the delivery belt 64. The separating roller 67 is arranged obliquely above the belt delivery unit 63 on the downstream side, and peels the fabric W1 after printing from the delivery belt 64 so as to feed it to the winding section 6.

The belt delivery unit 63 has a driving pulley 81 which is located on the downstream side of the feed direction, a driven pulley 82 which is located on the upstream side of the feed direction, and the delivery belt 64 with no end which is bridged between the driving pulley 81 and the driven pulley 82. The driving pulley 81 and the driven pulley 82 are supported by the pair of side frames 62 in a rotatable manner through special bearings. A delivery motor 86 for intermittently running the delivery belt 64 is coupled with an axial end of the driving pulley 81. The delivery belt 64 is constructed of a special wide belt having adhesion property (adhesion process) on the outer circumferential surface (front surface), and feeds the fabric W1 in the X axial direction by attaching the fabric W1 thereto. Consequently, the fabric W1 is fed for printing (intermittently fed) right below the printing section 5 without the occurrence of curl.

The printing section 5 has a printer frame 101, the head moving mechanism 16, the carriage unit 14, and a printer cover 102. The printer frame 101 extends in the Y axial direction so as to straddle the feed route 3 (the belt delivery unit 63). The head moving mechanism 16 is supported by the printer frame 101. The carriage unit 14 is installed in the head moving mechanism 16, and moves back and forth in the Y axial direction. The printer cover 102 covers these elements. Although they are not shown in the drawings, a cap unit, a cleaning unit, and the like for maintenance of the inkjet head 15 are installed in the printing section 5. Further, a gap adjusting section 150 is provided to adjust a work gap G between a nozzle surface of the inkjet head 15 and the fabric W1 on the delivery belt 64 by moving the entire printing section 5 up and down with respect to the device main body 4 (the medium feed mechanism 12).

The carriage unit 14 has a plurality of (for example, twelve) inkjet heads 15 and a carriage 107. The inkjet heads 15 have lines of nozzles for a plurality of colors for color printing. The carriage 107 retains the plurality of inkjet heads 15 such that the nozzle surfaces are directed downward. The plurality of inkjet heads 15 are arranged in a zigzag pattern with respect to each other in the X axial direction such that the lines of nozzles are in parallel with the X axial direction, respectively. Dye ink of each color to be supplied to each line of nozzles is supplied from a so-called off-carriage ink tank.

The head moving mechanism 16 has two carriage guides 111, a timing belt 116, and a carriage motor 113. The carriage guides 111 slidably support the carriage unit 14 in the Y axial direction with a cantilever structure. The timing belt 116 moves the carriage unit 14 back and forth along the carriage guides 111. The carriage motor 113 runs the timing belt 116 forward and backward. When the timing belt 116 is caused to run forward and backward by the carriage motor 113, the carriage unit 14 is guided by the carriage guides 111 and moves back and forth in the Y axial direction.

Further, the ejection amount of ink drops IN (see FIGS. 4A and 4B) from each nozzle of the inkjet heads 15 can be adjusted by the control section 7 by controlling applied voltage of driving waveforms applied to piezoelectric elements of the inkjet heads 15. In the present embodiment, the ejection amount is adjusted with three levels including L (large), M (medium), and S (small). With this, the inkjet heads 15 can form dots D (see FIGS. 4A and 4B) of three types of sizes (L, M, and S) on the fabric W1.

The gap adjusting section 150 has a left adjusting section 151, a right adjusting section (not shown in the drawing), and a coupling shaft (not shown in the drawing). The left adjusting section 151 and the right adjusting section are provided on both outer sides of the right and left side frames 62. The coupling shaft allows the left adjusting section 151 and the right adjusting section to move in accordance with each other. The left adjusting section 151 and the right adjusting section have a cam mechanism for moving the left portion and the right portion of the printing section 5 up and down, respectively. When an operation handle 164, provided in the left adjusting section 151, is rotated forward and backward, the cam mechanism of the left adjusting section 151 operates and the cam mechanism of the right adjusting section also operates via the coupling shaft. Consequently, the entire printing section 5 is moved up and down with respect to the device main body 4 (the medium feed mechanism 12) so as to adjust the work gap G.

The gap adjusting section 150 also has a dial gauge 154 for measuring the work gap G which changes in accordance with gap adjustment. Incidentally, the work gap G is adjusted to a relatively large value such as approximately 2-3 mm in the case of the fabric W1 (in the case of paper, approximately 0.5 mm) because the irregularities on the surface are large in the case of the fabric W1 compared to the case of paper, which might cause curl or the like in the end of the width of the fabric W1.

Figure 3:
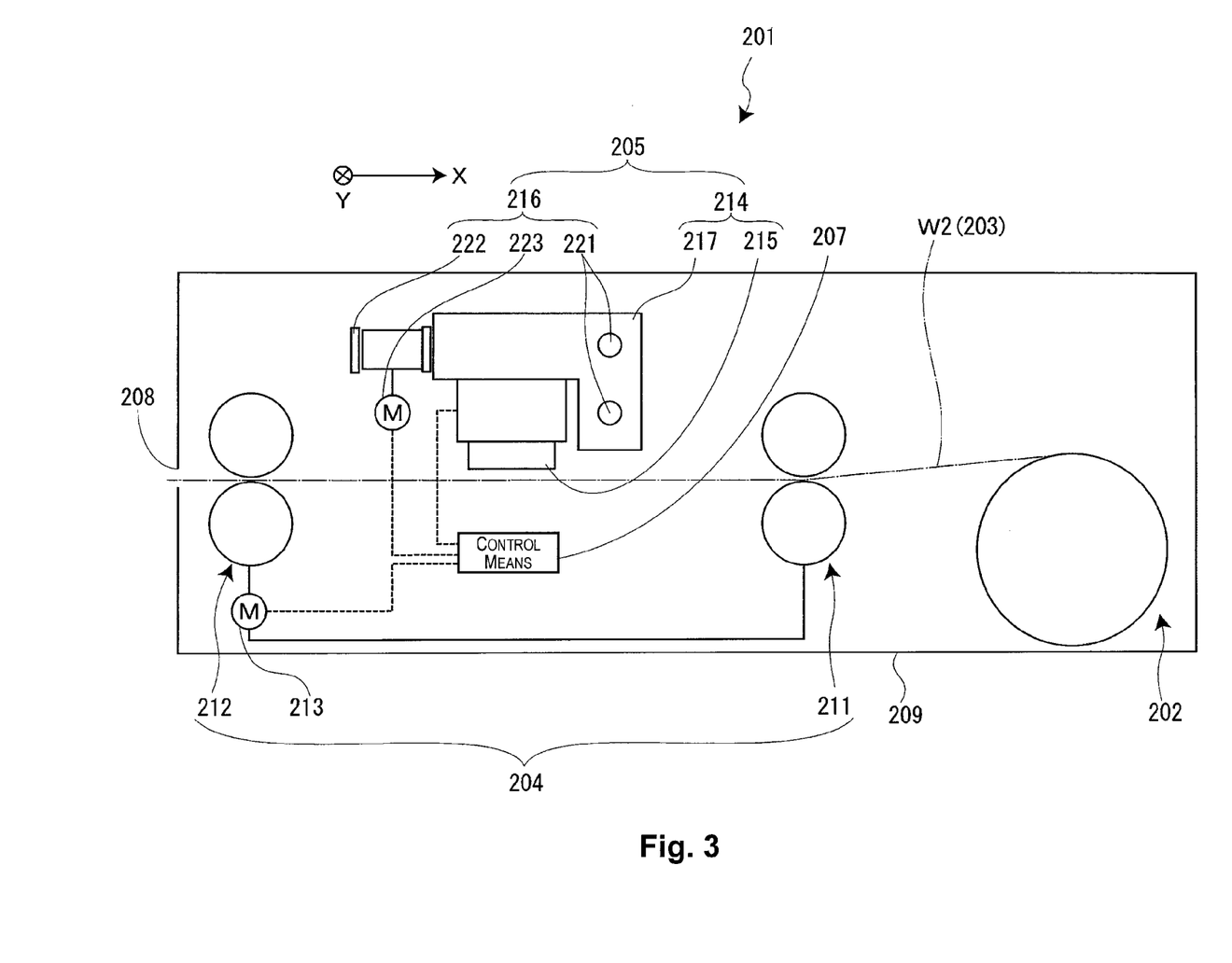
FIG. 3 is a cross-sectional configuration diagram that schematically shows a second inkjet recording device which configures the inkjet recording system.

Subsequently, the second inkjet recording device 201 will be explained with reference to FIG. 3. The second inkjet recording device 201 conducts printing of patterns or the like to a recording medium W2 such as printing paper or the like by an inkjet method using the same dye ink as used for the first inkjet recording device 1. As for the recording medium W2, the same material as the fabric W1 printed by the first inkjet recording device 1 can be used. In the following explanation of the second inkjet recording device 201, a forward and backward feed direction of the recording medium W2 is defined as an X axial direction, and a direction orthogonal to the X axial direction is defined as a Y axial direction. Also, in the same manner as the first inkjet recording device 1, the second inkjet recording device 201 can conduct printing to the recording medium W2 having a maximum width of 1.5 m, and thus the second inkjet recording device 201 has a size in the Y axial direction similar to the first inkjet recording device 1 (approximately 2.5 m). However, the size of the X axial direction is smaller than that of the first inkjet recording device 1 (approximately 1 m). Thus, the second inkjet recording device 201 is small-sized as a whole compared to the first inkjet recording device 1, and the print speed is low.

As shown in the same drawing, the second inkjet recording device 201 has a medium loading section 202, a feeding means 204, a printing means 205, a control means 207, and a device case 209. The medium loading section 202 is loaded with the recording medium W2 (roll paper) wound in a roll shape such that the recording medium W2 can be reeled out. The feeding means 204 feeds the recording medium W2, which has been reeled out from the medium loading section 202, along a feed route 203. The printing means 205 conducts printing to the recording medium W2 by an inkjet method in cooperation with feeding means 204. The control means 207 conducts overall control to the entire device of this configuration. The device case 209 accommodates these elements, and a medium discharge port 208 is formed in the device case 209.

The feeding means 204 has an upstream side feed roller 211, a downstream side feed roller 212, and a feed motor 213. The upstream side feed roller 211 and the downstream side feed roller 212 extend in the Y axial direction, and are constructed of a grip roller, respectively. The feed motor 213 rotates and drives the upstream side feed roller 211 and the downstream side feed roller 212 through a power transmission mechanism (not shown in the drawing). Further, the control means 207 drives and controls the feed motor 213 so as to intermittently feed the recording medium W2 in the X axial direction.

The printing means 205 has a carriage unit 214, and a head moving means 216. The carriage unit 214 has an inkjet head 215. The head moving means 216 moves the carriage unit 214 back and forth in the Y axial direction. Although they are not shown in the drawings, a cap unit, a cleaning unit, and the like for maintenance of the inkjet head 215 are installed in the printing means 205.

The carriage unit 214 has the inkjet head 215 and a carriage 217. The number of the inkjet head 215 is smaller (for example, one or two) than the number of the inkjet heads 15 installed in the first inkjet recording device 1 (for example, twelve). The carriage 217 retains the inkjet head 215 such that the nozzle surface is directed downward. The inkjet head 215 has the same configuration as the inkjet heads 15 installed in the first inkjet recording device 1, and the inkjet head 215 is retained in the carriage 217 such that the line of nozzles is in parallel with the X axial direction. Dye ink of each color to be supplied to each line of nozzles is supplied from a so-called off-carriage ink tank.

The head moving means 216 has two carriage guides 221, a timing belt 222, and a carriage motor 223. The carriage guides 221 slidably support the carriage unit 214 in the Y axial direction with a cantilever structure. The timing belt 222 moves the carriage unit 214 back and forth along the carriage guides 221. The carriage motor 223 runs the timing belt 222 forward and backward. When the timing belt 222 is caused to run forward and backward by the carriage motor 223, the carriage unit 214 is guided by the carriage guides 221 and moves back and forth in the Y axial direction. The speed of the carriage unit 214 moving back and forth in the second inkjet recording device 201 (the speed of a main scan) is lower than the speed of the carriage unit 14 in the first inkjet recording device 1.

Further, the ejection amount of ink drops IN from each nozzle of the inkjet head 215 can be adjusted by the control means 207 by controlling applied voltage of driving waveforms applied to a piezoelectric element of the inkjet head 215. In the present embodiment, the ejection amount is adjusted with three levels including L (large), M (medium), and S (small). With this, the inkjet head 215 can form dots D (see FIGS. 4A and 4B) of three types of sizes (L, M, and S) on the recording medium W2.

In the second inkjet recording device 201 of the configuration described above, while intermittently feeding (sub scanning) the recording medium W2 in the X axial direction by the feeding means 204, the carriage unit 214 moves back and forth in the Y axial direction in synchronization with this, and ink is ejected from the inkjet head 215 (main scanning). After printing is conducted in this manner, a portion of the recording medium W2 to which printing has been finished is fed to the outside from the medium discharge port 208.

As described above, the number of the inkjet heads 15 installed in the first inkjet recording device 1 (twelve) is larger than the number of the inkjet head 215 installed in the second inkjet recording device 201 (one or two). Also, the main scan speed of the inkjet heads 15 in the first inkjet recording device 1 is higher than the main scan speed of the inkjet head 215 in the second inkjet recording device 201. In the first inkjet recording device 1, therefore, a strong air flow is generated in the main scanning direction between the surface of the fabric W1 and the nozzle surfaces of the inkjet heads 15 at the time of main scans of the inkjet heads 15.

Figure 4A:
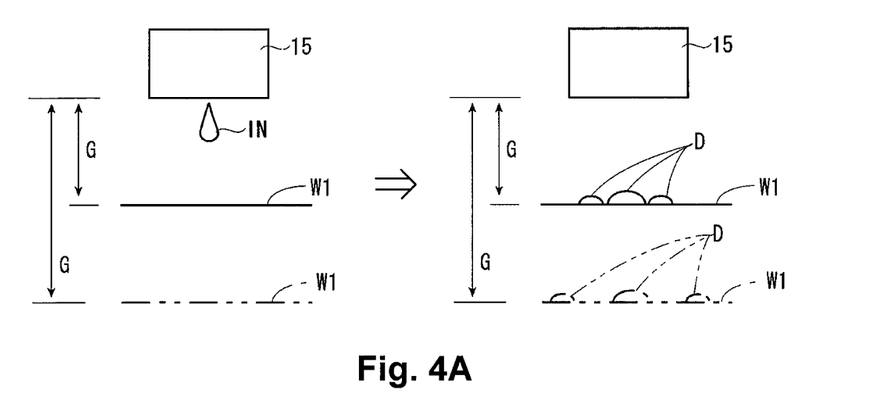
FIG. 4A is a diagram that shows dots formed on fabric by the first inkjet recording device.
Figure 4B:
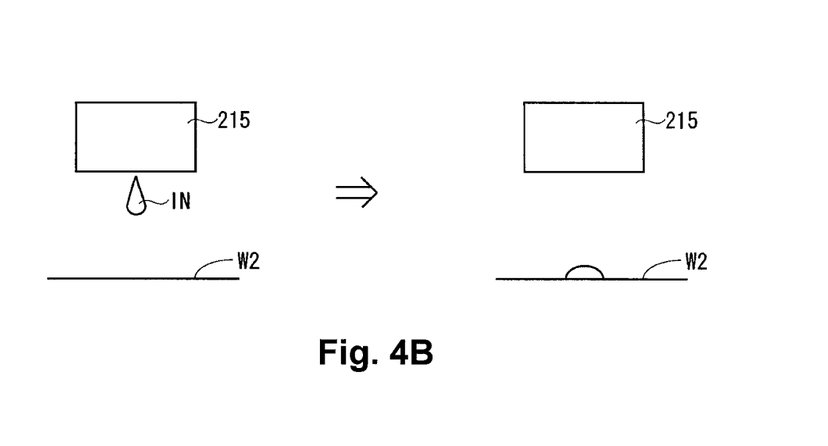
FIG. 4B is a diagram that shows dots formed on a recording medium by the second inkjet recording device.

In the first inkjet recording device 1, therefore, as shown in FIGS. 4A and 4B, the ink drop IN of one shot ejected from the inkjet head 15 lands onto the fabric W1 with being dispersed in the main scanning direction, and a plurality of dots D are formed with being dispersed in the main scanning direction (see FIG. 4A). On the other hand, in the second inkjet recording device 201, since this air flow is hardly ever generated, a plurality of dots D dispersed in the main scanning direction will not be formed by the ink drop IN of one shot (see FIG. 4B). Specifically, although the ink drop IN ejected from a nozzle of the inkjet head 15 with a tail is divided into a plurality of ink drops IN at the time of being separated from the nozzle, if the influence of the air flow is small, the divided ink drops IN land onto the recording medium W2 with being almost overlapped with each other so as to form one dot D. If the influence of the air flow is large, however, the divided ink drops IN land onto the recording medium W2 with being dispersed by the air flow so as to form a plurality of dots D.

Further, as shown in FIG. 4A, in the first inkjet recording device 1, when the work gap G is changed by the gap adjusting section 150 corresponding to the kind or the like of the fabric W1, the degree of dispersion in the main scanning direction of the landing ink drop IN (the ink dispersion degree) will change accordingly. Specifically, when the work gap G becomes large, the influence of the air flow will become large accordingly, and thus the ink dispersion degree will also become large (in FIG. 4A, the case where the influence of the air flow is large is shown by a two-dot chain line). Here, for convenience of illustration, FIG. 4A is illustrated such that the fabric W1 is moved up and down with respect to the inkjet head 15. In the present embodiment, however, the inkjet head 15 (the printing section 5) is moved up and down with respect to the fabric W1 (the medium feed mechanism 12) by the gap adjusting section 150 as described above.

As described above, since the ink dispersion degree is different between the first inkjet recording device 1 and the second inkjet recording device 201, if common dot data is used for the first inkjet recording device 1 and the second inkjet recording device 201, an actual image printed by the first inkjet recording device 1 becomes more blurred as a whole compared to a sample image printed by the second inkjet recording device 201 because the plurality of dots D are formed with being dispersed in the main scanning direction.

In the present embodiment, therefore, second dot data used for the second inkjet recording device 201 is generated by the dot data generating device 300 so as to print a sample image in the second inkjet recording device 201 with a degree of blur similar to an actual image printed by the first inkjet recording device 1.

The dot data generating device 300 is constructed by a personal computer or the like. As shown in FIG. 1, in terms of the function, the dot data generating device 300 has an image data generating section 301, a dot data generating section 302, a data converting section 303, a work gap acquiring section 304, an interval setting section 305, and an interval changing section 306.

The image data generating section 301 is implemented by application software for drawing a design, and generates image data of an actual image to be printed by the first inkjet recording device 1. However, image data drawn by another personal computer or the like can be imported into the dot data generating device 300.

Figure 5A:
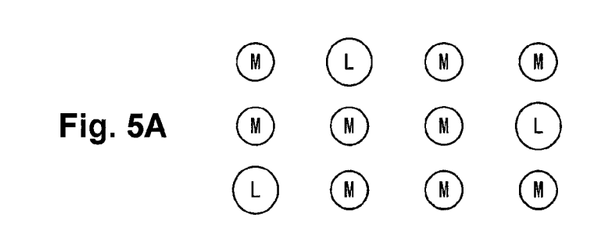
FIG. 5A is a diagram that shows first dot data.
Figure 5B:
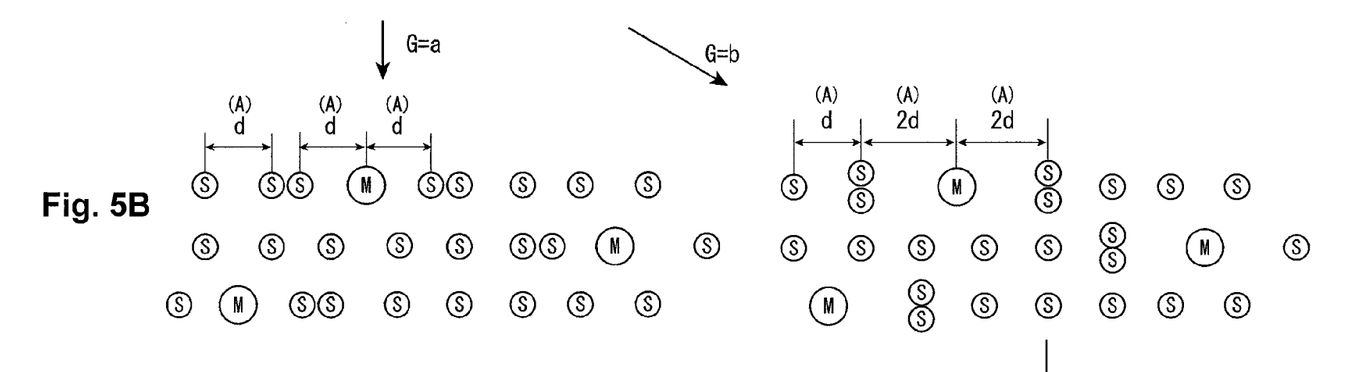
FIG. 5B is a diagram that shows data conversion of the first dot data.

The dot data generating section 302 conducts a halftone process or the like based on the tone of image data generated by the image data generating section 301, and generates first dot data used for the first inkjet recording device 1. As shown in FIG. 5A and FIG. 6A, the first dot data determines formation or non-formation of dots and sizes of dots. In FIGS. 5A-5C and FIGS. 6A-6C, "L" refers to a large dot D, "M" refers to a medium dot D, and "S" refers to a small dot D.

The data converting section 303 generates the second dot data by converting the first dot data in accordance with a predetermined dot division rule so as to cancel the difference in the way how the ink drop IN lands between the first inkjet recording device 1 and the second inkjet recording device 201. Specifically, as shown in FIG. 5B, the data converting section 303 converts data of each dot D whose size is determined as a large (L) size in the first dot data (see FIG. 5A) such that three dots D including a small (S) dot D, a medium (M) dot D, and a small (s) dot D are formed in the main scanning direction with predetermined intervals A between each other in place of the dot D in the first dot data. Also, the data converting section 303 converts data of each dot D whose size is determined as a medium (M) size in the first dot data such that two small (S) dots D are formed in the main scanning direction with a predetermined interval A in place of the dot D in the first dot data. The second dot data is generated by the data conversion of the first dot data described above. The predetermined interval A is set or changed by the interval setting section 305 or the interval changing section 306 described below. In a case where there is a dot D which protrudes from a drawing area as a result of the data conversion, data conversion is conducted such that the dot D will not be printed.

Figure 6A:
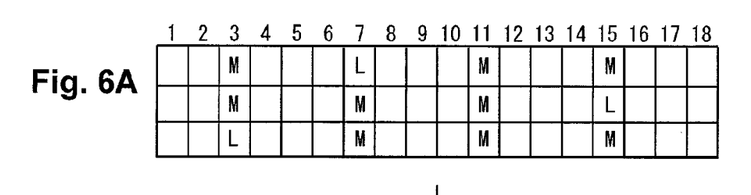
FIG. 6A is a diagram that shows the first dot data.
Figure 6B:
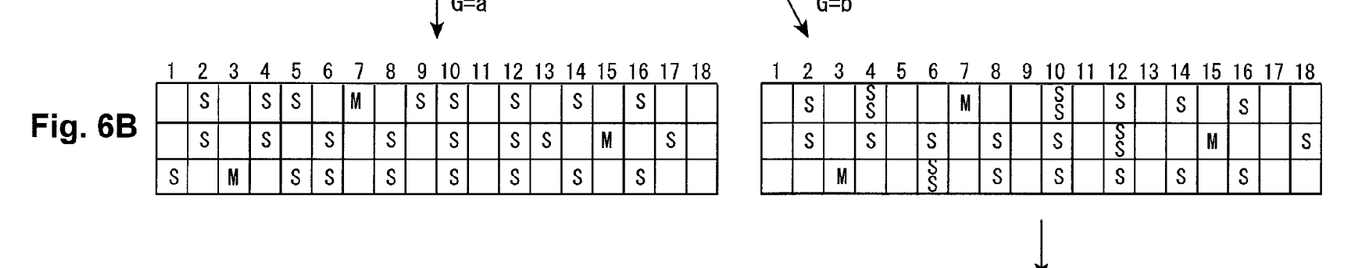
FIG. 6B is a diagram that shows data conversion of the first dot data.

In other words, as shown in FIG. 6B, the data converting section 303 conducts data conversion of a dot D whose size is a large (L) size in the first dot data (see FIG. 6A) such that a medium (M) dot D is formed in the pixel and two small (S) dots D are formed in pixels standing on the right and left of the pixel (in the main scanning direction) with the predetermined intervals A between each other. Also, the data converting section 303 conducts data conversion of a dot D whose size is a medium (M) size in the first dot data such that no dot D is formed in the pixel and two small (S) dots D are formed in pixels standing on the right and left of the pixel (in the main scanning direction) with the predetermined intervals A between each other. The second dot data is generated by the data conversion of the first dot data described above. In this data conversion, the resolution of the second dot data can be changed with respect to the first dot data.

Figure 5C:
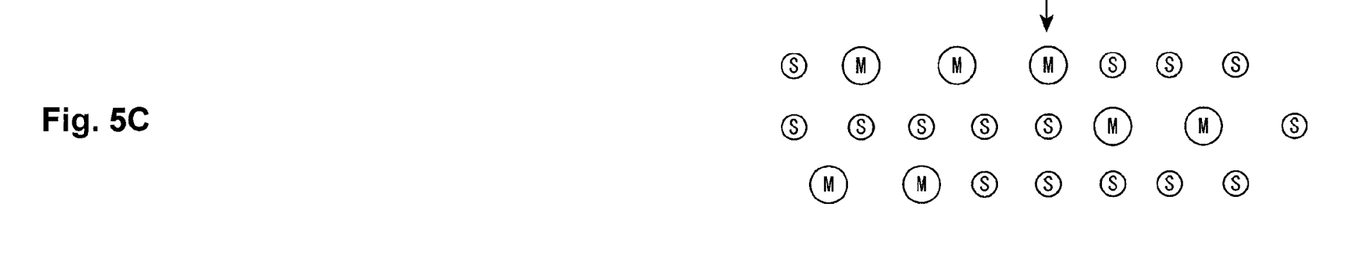
FIG. 5C is a diagram that shows data conversion for synthesizing dots overlapped in FIG. 5B.
Figure 6C:
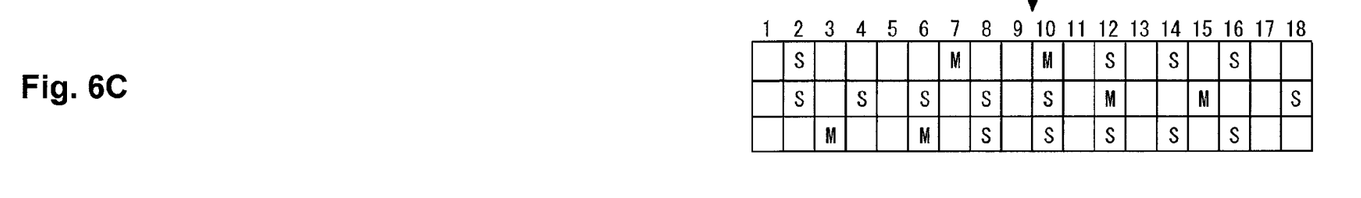
FIG. 6C is a diagram that shows data conversion for synthesizing dots overlapped in FIG. 6B.

Further, as shown in FIG. 5C and FIG. 6C, in a case where two small (S) dots D are formed to overlap each other as a result of the above-described data conversion (in a case where the work gap G is "b" (G=b)), the data converting section 303 further conducts data conversion to synthesize the dots into one medium (M) dot D so as to generate the second dot data. In order to form two small (S) dots D so as to overlap each other, two shots of small (S) ink drops IN need to be ejected and caused to land onto the same position of the recording medium W2 from the inkjet head 215, which requires a complicated ejection operation. However, the complicated operation can be avoided by synthesizing the two dots D into one medium (M) dot D. Further, in a case where a small (S) dot D and a medium (M) dot D are generated, the dots D are synthesized into one large (L) dot D, and in a case of a combination of dots D having a size equal to or larger than the above, the dots D are synthesized into one large (L) dot D.

The work gap acquiring section 304 acquires the work gap G in the first inkjet recording device 1 by input of a user. A user reads the work gap G measured by the dial gauge 154 in the first inkjet recording device 1, and inputs the measured value by a keyboard, a GUI (Graphical User Interface) button, or the like of the dot data generating device 300. Needless to say, it can be configured such that the measured value of the work gap G measured by the dial gauge 154 is output to the dot data generating device 300 directly (without input of a user).

The interval setting section 305 sets the predetermined interval A used for the data converting section 303 based on the work gap G of the first inkjet recording device 1 acquired by the work gap acquiring section 304. Specifically, as described above, in the first inkjet recording device 1, when the work gap G becomes large, the ink dispersion degree will become large. Therefore, as the work gap G becomes large, the predetermined interval A is set to become large. For example, in A=α×d (d=50 μm), in a case where the work gap G is "a" (G=a), "α" is made 1 both in the large (L) dot D and the medium (M) dot D, and the predetermined interval A is set to "d" (50 μm). Also, in a case where the work gap G is "b" (G=b>a), "α" is made 1 in the medium (M) dot D and the predetermined interval A is set to "d" (50 μm), and "α" is made 2 in the large (L) dot D and the predetermined interval A is set to "2d" (100 μm).

The interval changing section 306 changes the predetermined interval A set in the interval setting section 305 according to the value of the "degree of a blurring process" input by a user using a keyboard or the like of the dot data generating device 300. For example, when +1 is input in a configuration in which the "degree of a blurring process" can be input with three levels including +2, +1, and 0, the value of "α" in A=α×d is increased by 1 (+1), so that a more blurred image can be printed. With this, a user can optionally change the degree of blur in a sample image printed by the second inkjet recording device 201. Therefore, in a case where the print quality (the degree of blur) of an actual image printed by the first inkjet recording device 1 is different due to the kind of the fabric W1, the print resolution and the pattern of the actual image, and the like, a user can change the degree of blur in a sample image printed by the second inkjet recording device 201 accordingly. In the present embodiment, changing of the predetermined interval A by the interval changing section 306 is not conducted ("0" is input as the "degree of a blurring process").

The second dot data generated by the dot data generating device 300 in the manner described above is output to the second inkjet recording device 201. In the second inkjet recording device 201, the control means 207 drives the inkjet head 215 and conducts printing of a sample image to the recording medium W2 based on the second dot data. After the design or the like is confirmed by a user based on the sample image, the first dot data generated by the dot data generating device 300 is output to the first inkjet recording device 1. In the first inkjet recording device 1, the control section 7 drives the inkjet heads 15 and conducts printing of an actual image to the fabric W1 based on the first dot data.

A sample image is printed based on the second dot data obtained by converting the first dot data in accordance with the above-described dot division rule in the second inkjet recording device 201 in which the ink dispersion degree is small compared to the first inkjet recording device 1. Therefore, dots D formed by the second inkjet recording device 201 based on the second dot data are formed with being dispersed in the main scanning direction similarly to dots formed by the first inkjet recording device 1 based on the first dot data, compared to dots formed by the second inkjet recording device 201 based on the first dot data, if dots were formed by the second inkjet recording device 201 based on the first dot data. Consequently, a sample image whose print quality is blurred similarly to an actual image can be obtained even in a case where the sample image is printed by the second inkjet recording device 201 in which the ink dispersion degree is small compared to the first inkjet recording device 1 for printing an actual image. That is, although the image becomes blurred in the first inkjet recording device 1 because dots D are formed with being dispersed in the main scanning direction, dots D are formed with being dispersed in the main scanning direction also in the second inkjet recording device 201 by using the second dot data converted as described above. As a result, the sample image of a similar degree of blur can be obtained.

Further, by setting the predetermined interval A based on the work gap G in the first inkjet recording device 1 by the interval setting section 305, dots D can be formed with a similar degree of dispersion by the second inkjet recording device 201 corresponding to the ink dispersion degree which is changed by the work gap G in the first inkjet recording device 1. Therefore, even when the work gap G is changed and the degree of blur of the actual image is changed in the first inkjet recording device 1, the sample image with a degree of blur corresponding to the change can be printed by the second inkjet recording device 201.

As described above, according to the inkjet recording system of the present embodiment, a sample image of print quality similar to that of an actual image can be obtained in a case where the sample image is printed by the second inkjet recording device 201 in which ink drops IN land in the main scanning direction with a different degree of dispersion from the first inkjet recording device 1 for printing an actual image.

Also, in the present embodiment, the second dot data is generated by the dot data generating device 300. However, it can be configured such that the control means 207 of the second inkjet recording device 201 serves as at least the data converting section 303 among the sections of the dot data generating device 300, and the second dot data can be generated in the second inkjet recording device 201.

Further, in the present embodiment, the first inkjet recording device 1 is a machine for mass production, and the second inkjet recording device 201 is a machine for producing a sample. However, the invention is not limited to this. For example, when actual images are printed using a plurality of first inkjet recording devices 1, actual images of uniform print quality can be obtained from any of the first inkjet recording devices 1 by applying the invention.

Also, the invention can be applied to a so-called line printer or a printer in which the inkjet head 15 is moved in the XY direction (the main scanning direction and the sub scanning direction). Therefore, for example, in a case where a sample image is printed by the second inkjet recording device 201 in which ejected ink drops IN land with a small degree of dispersion in the sub scanning direction compared to the first inkjet recording device 1, the second dot data can be generated by conducting data conversion of the first dot data such that an L dot and an M dot are divided in the sub scanning direction instead of the data conversion in which an L dot and an M dot are divided in the main scanning direction as conducted in the present embodiment.

What is claimed is:

1. A dot data generating method using a first inkjet recording device and a second inkjet recording device, each of which conducts printing of an image by ejecting ink drops from an inkjet head and forming dots of various sizes on a recording medium while relatively moving the inkjet head with respect to the recording medium, with the inkjet head being able to form dots of a plurality of types of sizes on a recording medium, in which a first image is printed using the first inkjet recording device by ejecting ink drops from the inkjet head onto the recording medium based on first dot data which determines formation or non-formation of dots and sizes of dots, and second dot data is generated to print a second image by ejecting ink drops from the inkjet head onto another recording medium based on the second dot data using the second inkjet recording device in which ejected ink drops land onto a recording medium with a small degree of dispersion in a relative movement direction compared to the first inkjet recording device, the dot data generating method comprising:

generating the second dot data by converting the first dot data such that data of each dot in which at least a maximum dot size is determined is converted so as to form a plurality of dots having sizes smaller than the maximum dot size at predetermined intervals between the dots in the relative movement direction in place of the each dot.

2. The dot data generating method according to claim 1 further comprising:

acquiring a work gap between a surface of the recording medium and a nozzle surface of the inkjet head in the first inkjet recording device; and setting the predetermined interval based on an acquired work gap.

3. The dot data generating method according to claim 1 further comprising:

changing the predetermined interval based on input of a user.

4. The dot data generating method according to claim 1, wherein in the generating, in a case where a plurality of dots are formed with being overlapped by converting the data, the data is further converted such that the plurality of dots are synthesized into a single dot.

5. A dot data generating device using a first inkjet recording device and a second inkjet recording device, each of which conducts printing of an image by ejecting ink drops from an inkjet head and forming dots of various sizes on a recording medium while relatively moving the inkjet head with respect to the recording medium, with the inkjet head being able to form dots of a plurality of types of sizes on a recording medium, in which a first image is printed using the first inkjet recording device by ejecting ink drops from the inkjet head onto the recording medium based on first dot data which determines formation or non-formation of dots and sizes of dots, and second dot data is generated to print a second image by ejecting ink drops from the inkjet head onto another recording medium based on the second dot data using the second inkjet recording device in which ejected ink drops land onto a recording medium with a small degree of dispersion in a relative movement direction compared to the first inkjet recording device, the dot data generating device comprising:

a data conversion section which generates the second dot data by converting the first dot data such that data of each dot in which at least a maximum dot size is determined is converted so as to form a plurality of dots having sizes smaller than the maximum dot size at predetermined intervals between the dots in the relative movement direction in place of the each dot.

6. An inkjet recording device which prints a second image by ejecting ink drops from an inkjet head and forming dots of various sizes on a recording medium while relatively moving the inkjet head with respect to the recording medium, with the inkjet head being able to form dots of a plurality of types of sizes on a recording medium, based on second dot data generated by converting first dot data which is used for another inkjet recording device which prints a first image by ejecting ink drops from an inkjet head onto a recording medium while relatively moving the inkjet head with respect to the recording medium, with the inkjet head being able to form dots of a plurality of types of sizes on a recording medium, based on the first dot data which determines formation or non-formation of dots and sizes of dots, in the inkjet recording device, ejected ink drops landing onto a recording medium with a small degree of dispersion in a relative movement direction compared to the another inkjet recording device, the inkjet recording device comprising:

a data conversion section which generates the second dot data hy converting the first dot data such that data of each dot in which at least a maximum dot size is determined is converted so as to form a plurality of dots having sizes smaller than the maximum dot size at predetermined intervals between the dots in the relative movement direction in place of the each dot.

7. An inkjet recording system using a first inkjet recording device and a second inkjet recording device, each of which conducts printing of an image by ejecting ink drops from an inkjet head and forming dots of various sizes on a recording medium while relatively moving the inkjet head with respect to the recording medium, with the inkjet head being able to form dots of a plurality of types of sizes on a recording medium, in which a first image is printed using the first inkjet recording device by ejecting ink drops from the inkjet head onto the recording medium based on first dot data which determines formation or non-formation of dots and sizes of dots, and a second image is printed by ejecting ink drops from the inkjet head onto another recording medium based on second dot data using the second inkjet recording device in which ejected ink drops land onto a recording medium with a small degree of dispersion in a relative movement direction compared to the first inkjet recording device, the inkjet recording system comprising:

the first inkjet recording device;
the second inkjet recording device; and
a dot data generating device which generates the second dot data, and
the dot data generating device including a data conversion section which generates the second dot data by converting the first dot data such that data of each dot in which at least a maximum dot size is determined is converted so as to form a plurality of dots having sizes smaller than the maximum dot size at predetermined intervals between the dots in the relative movement direction in place of the each dot.

8. An inkjet recording system using a first inkjet recording device and a second inkjet recording device, each of which conducts printing of an image by ejecting ink drops from an inkjet head and forming dots of various sizes on a recording medium while relatively moving the inkjet head with respect to the recording medium, with the inkjet head being able to form dots of a plurality of types of sizes on a recording medium, in which a first image is printed using the first inkjet recording device by ejecting ink drops from the inkjet head onto the recording medium based on first dot data which determines formation or non-formation of dots and sizes of dots, and a second image is printed by ejecting ink drops from the inkjet head onto another recording medium based on second dot data using the second inkjet recording device in which ejected ink drops land onto a recording medium with a small degree of dispersion in a relative movement direction compared to the first inkjet recording device, the inkjet recording system comprising:

the first inkjet recording device; and
the second inkjet recording device, and
the second inkjet recording device including a data conversion section which generates the second dot data by converting the first dot data such that data of each dot in which at least a maximum dot size is determined is converted so as to form a plurality of dots having sizes smaller than the maximum dot size at predetermined intervals between the dots in the relative movement direction in place of the each dot.

* * * * *